Aug. 13, 1968 — R. W. SCHEID — 3,397,007
SPRING ACTUATED PERMANENT TOP FOR CAMPING TRAILER
Filed March 25, 1966 — 2 Sheets-Sheet 1

INVENTOR
RICHARD W. SCHEID,
BY Yungblut, Melville, Strasser and Foster
ATTORNEYS

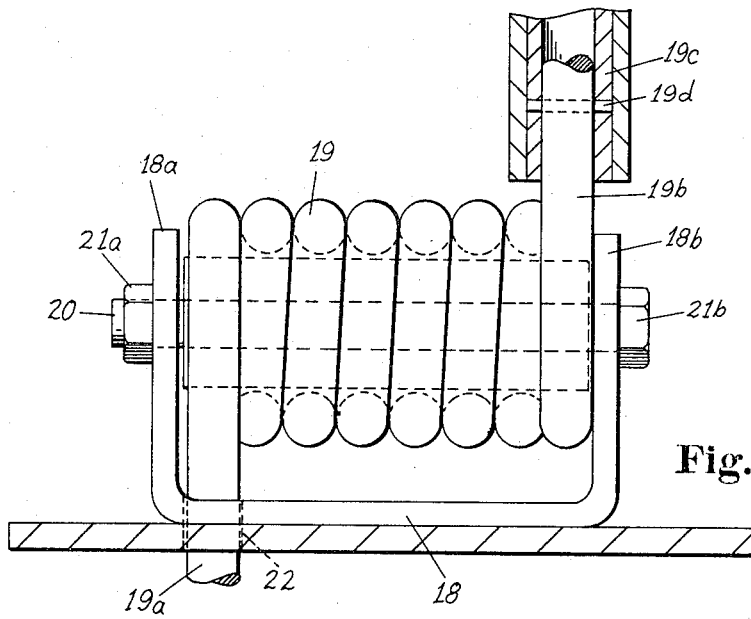
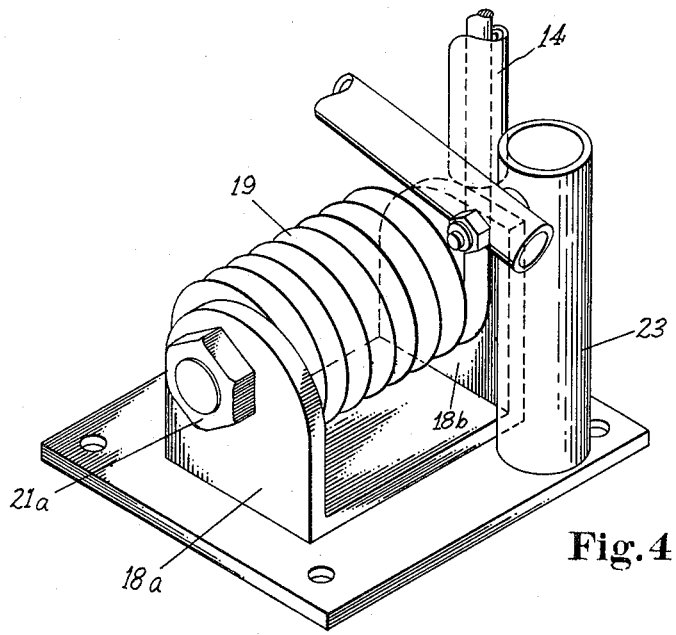
Fig. 5
Fig. 4

United States Patent Office 3,397,007
Patented Aug. 13, 1968

3,397,007
SPRING ACTUATED PERMANENT TOP FOR
CAMPING TRAILER
Richard W. Scheid, Hamilton, Ohio, assignor to Ward
Manufacturing, Inc., Cincinnati, Ohio, a corporation of
Ohio
Filed Mar. 25, 1966, Ser. No. 537,504
5 Claims. (Cl. 296—27)

ABSTRACT OF THE DISCLOSURE

A camping trailer having a body supporting a pair of beds movable horizontally between retracted and extended positions and including a cover supported by spring biased support legs mounted on the beds to facilitate for conveniently moving the cover between collapsed and raised positions in response to movement of the beds between the retracted and extended positions.

---

In the field of camping trailer which employ a two-wheeled chassis supporting a body, it is common to provide a pair of horizontally disposed beds which are movable horizontally between a retracted position for storing and towing the trailer and an extended position for using the trailer after it is parked at a camping site. The trailer is also provided with some form of collapsible cover such as a canvas tent which is set up or raised over the extended beds and the body to provide a protected living and sleeping area.

Another form of cover includes a rigid top which acts as a cover for the trailer in collapsed condition for towing and which acts as a roof over the trailer when the beds are extended. Such rigid or semi-rigid tops are connected to the beds by pivotable support legs so that when the beds are extended, the top is automatically raised. Canvas walls are connected to the periphery of the top and the beds and are attached to the body after the top is raised.

It is desirable to construct a camping trailer so that one person can conveniently and quickly extend and retract the beds as well as raise and collapse the cover. Due to the weight of the rigid top and the canvas walls connected to the top, however, a substantial pulling force must be extended on each bed to produce simultaneous extension of the bed and raising of the corresponding end portion of the top.

Summary of the invention

The present invention provides a camping trailer having extendable beds and incorporating a simplified and compact means for connecting each leg to a bed for biasing the leg towards a generally upright position so that the force necessary to extend the beds and elevate the top is substantially reduced. In accordance with the preferred form of the invention, each support leg is tubular and is biased by a torsion coil spring mounted on a bracket rigidly connected to a bed. Each spring has one end portion secured to the bracket and the other end portion received within the end portion of the support leg so that the coil spring not only produces a substantial biasing force on the leg but also serves as a simplified and compact pivot connection between the leg and the bed.

Brief description of the drawings

FIG. 4 is a perspective view of one of the spring and support arm assemblies incorporated in the trailer of FIGS. 1–3, showing the support arm in its fully set-up stages; and FIG. 5 is a side elevation of the assembly of FIG. 4.

In brief, this invention relies upon the force equation:

$$A = B + C$$

where:

$A$ = force exerted by the weight of the top,
$B$ = constrained force of the spring,
$C$ = force required to overcome resistance of the lateral movement of beds.

In other words, the force exerted by the operator is supplemented by the built-in forces in the assembly to set up and dismantle the camping trailer. Thus, a minimum of force is required to unbalance the aforementioned equation. Once the camping trailer is placed in the traveling or camping position, a latch or brace is provided to maintain said position.

Figure 1:
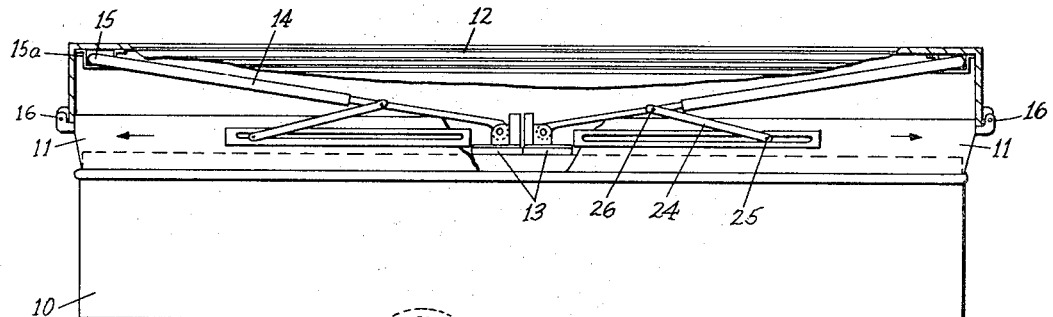
FIGS. 1–3 show a camping trailer in accordance with the invention in three successive stages, namely collapsed for transport, intermediate set-up and fully set-up, respectively.

With particular reference to FIGURE 1, the camping trailer chassis 10 is provided with two slidably mounted beds 11, each attached to a common base with two spring assemblies 13, and two support legs 14, each leg 14 extending from and secured to one of said spring assemblies 13 and terminating at its opposite end with a horizontal member 15 common to a set of two legs and two spring assemblies 13 and adjacent to the underside of top 12. Movement of each said horizontal member with respect to said top may be limited within an appropriate U-shaped bracket 15A firmly attached to the underside of top 12. Connection 16 may be any suitable latching means to prevent premature springing of top 12 during movement of the trailer. Brace 17 abuts chassis 10 after set-up to prevent any inward movement of bed 11 and collapsing of top 12.

Each spring assembly 13, illustrated in detail in FIGURES 4 and 5, comprises a bracket 18 with vertical extensions 18a and 18b, a coiled spring 19 axially confined by extensions 18a and 18b, a threaded stud member 20 extending through the center of said spring and base plate extensions and securely fastened thereto by nuts 21a and 21b. It is contemplated by this invention that a headed bolt may replace the stud element and be fastened by a single nut or other appropriate means. A further modification is the provision of a spacer surrounding the stud element to space said stud element from said coiled spring. Bracket 18 is provided with a plurality of holes adapted to receive a fastening element and be securely attached to a slidable base in common with at least one bed. The bracket 18 contains an additional opening 22 adapted to receive and restrict the relative movement of the spring extension 19a. The free end 19b of spring 19 is confined to a movement, relative to the bracket 18, of about 90°. A suitable stop or abutting means 23 may be provided adjacent the spring 19 to limit the free end 19b from unwinding beyond the vertical position. To secure a rigid extension from spring end 19b, it may be desirable to provide a sleeve 19c around spring end 19b, adapted to be contiguous with the internal surface of said support leg 14, all of which have a common hole therethrough capable of receiving a pin 19D to restrict movement thereof.

Figure 2:
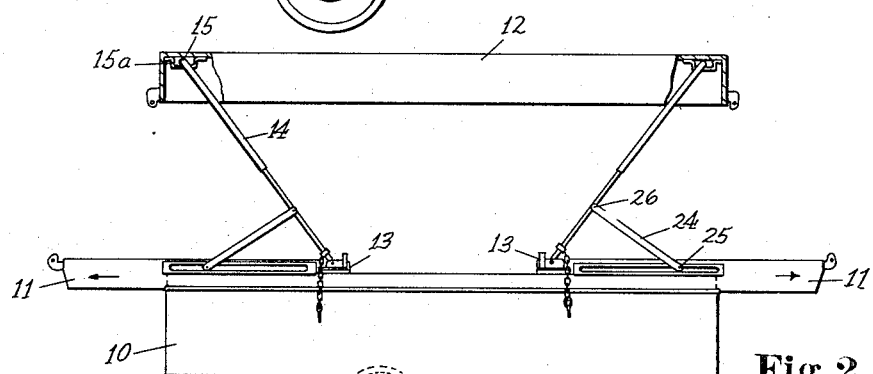
Figure 3:
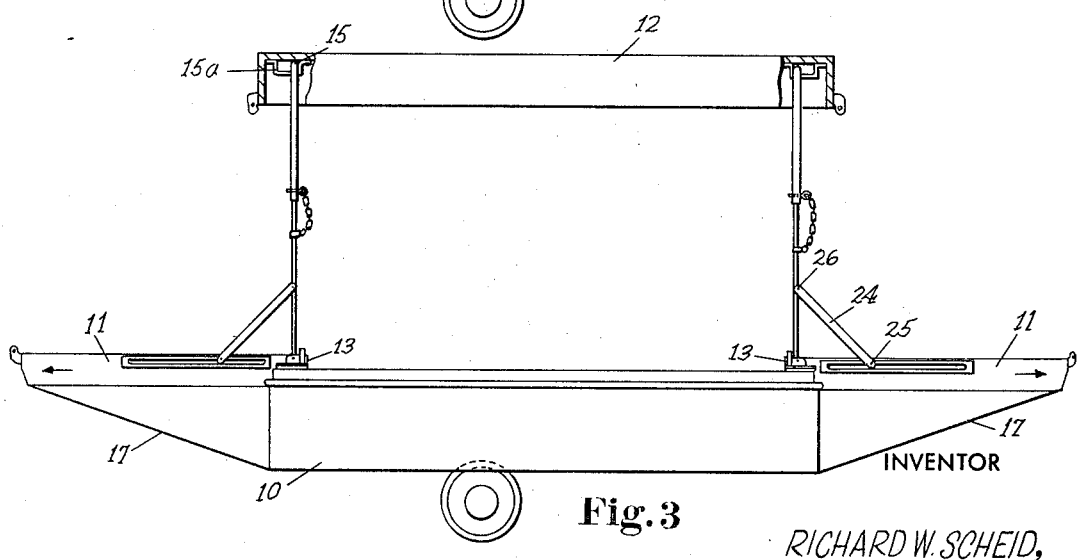

To help illustrate the ease with which the setup is accomplished, refer to the three stages of set-up in FIGURES 1 to 3. In FIGURE 1, when the latch means 16 are released, the springs of assemblies 13 unwind slightly raising the top until balance is achieved in the aforementioned equation. As a lateral force is now applied to each of said beds 11, away from one another, the top 12 begins to move upwardly and the springs unwind until the condition of FIGURE 3 is reached. Brace 17 is now put in place to insure against collapsing. Arm brace 24, like the brace 17 and abutment 23, may be added (illustrated in FIGURE 3) as a safety measure to prevent the hard top assembly 12 from falling as a unit to the right or left. Arm brace 24 may be pivotally mounted from an inoperative position on the adjacent bed frame at 25, to an operative position and secured to the leg 14 by a wing nut 26 or similar means. For additional height under the top 12, telescopic extensions may be provided in support arm 14. The telescopic extension may be set at varying heights and locked in place by a pin extending therethrough.

While the following is not limiting to the practicing of this invention, it has been found that a helically wound heat treated steel wire of about .362 inch diameter with an approximate O.D. and I.D. of 1⅞ and 1 and ⅛ inches respectively, is suitable to secure the inventive results. The selection of strength and weight of the spring will, in part, depend upon the type of permanent top desired. It should be remembered that the spring, with minimum assistance, must be capable of lifting the top to its uppermost condition. Therefore, with four of the foregoing springs, a top made of polyethylene weighing about 60 pounds including hardware, has been used. It is thus clear that a multitude of materials may be employed in the construction of this top, such as numerous ABS plastics, aluminum, wood, fibreglass, and the like, without departing from the spirit of this invention. The instant invention has been demonstrated with considerable success in raising tops of nearly twice the weight of the aforementioned example.

Now having fully described the invention, the embodiments of the invention in which an exclusive property or privilege is claimed are defined as follows:

1. A camping trailer or the like, comprising a chassis, a pair of horizontally disposed beds mounted on said chassis for movement generally horizontally between retracted and extended positions, cover means, a set of rigid support legs each having one end connected to said cover means, means forming a pivotal connection between the opposite end of each said legs and the adjacent said bed for movement of said legs with said beds to move said cover means between a collapsed position and a raised position in response to movement of said beds between said retracted and said extended positions, and a torsion spring associated with each of said pivotal connections and arranged to bias the corresponding said leg torsionally in the direction to raise said cover means and thereby to facilitate said movement of said cover means in response to movement of said beds.

2. A camping trailer as defined in claim 1 wherein said cover means includes a substantial rigid top member, a horizontally extending member rigidly connecting said legs associated with each said bed, and means on said top member for rotatably supporting each said horizontally extending member.

3. A camping trailer as defined in claim 1 wherein each said leg comprises a tubular end portion receiving an end portion of the corresponding said spring, a bracket for supporting each said spring, and means for rigidly mounting each said bracket on the corresponding said bed so that said spring forms said pivotal connection between said leg and said bed.

4. A camping trailer or the like, comprising a chassis, a plurality of support legs each having a tubular end portion, a bracket for each said leg, means mounted on said chassis for supporting each said bracket, a helical coil torsion spring mounted on each said bracket, and each said spring having one end portion secured to the corresponding said bracket and another end portion received within said end portion of the corresponding said leg to provide a torsional bias for each said leg in addition to a simplified and compact pivot connection between said leg and the corresponding said bracket.

5. A camping trailer or the like, comprising a chassis, collapsible cover means for said chassis, a plurality of legs arranged to support said cover means, a torsion coil spring associated with each said leg, each said spring having opposite end portions, means mounted on said chassis and supporting one end portion of each said spring, means connecting the other said end portion of each said spring to the corresponding said leg for pivotally supporting said leg for movement between a retracted position and a generally upright position for moving said cover means between a collapsed position and a raised position, and each said spring being arranged to produce a biasing torque on the corresponding said leg in a direction to move said leg toward said upright position to facilitate moving said cover means between said collapsed and raised positions in addition to providing a simplified pivotal support for said leg.

References Cited
UNITED STATES PATENTS

| | | | |
|---|---|---|---|
| 3,048,438 | 8/1962 | Koch | 296—27 |
| 2,714,524 | 8/1955 | Swiggum | 296—23 |
| 2,954,260 | 9/1960 | Wright | 296—23 |
| 3,013,836 | 12/1961 | Groh | 296—23 |
| 2,767,735 | 10/1956 | Darling. | |
| 1,925,945 | 9/1933 | Zielinski. | |
| 3,280,806 | 10/1966 | Iskenderian. | |

PHILIP GOODMAN, *Primary Examiner.*